United States Patent
Song et al.

(10) Patent No.: US 10,146,378 B2
(45) Date of Patent: Dec. 4, 2018

(54) TOUCH SENSIBLE OPTICAL SYSTEM AND DISPLAY DEVICE INCLUDING THE SAME

(71) Applicant: SAMSUNG DISPLAY CO., LTD., Yongin-si, Gyeonggi-Do (KR)

(72) Inventors: Jin Oh Song, Seoul (KR); Kang-Min Kim, Hwaseong-si (KR); Hae Young Yun, Suwon-si (KR); Hyung Woo Yim, Goyang-si (KR); Kyung Ho Jung, Seongnam-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 232 days.

(21) Appl. No.: 14/885,783

(22) Filed: Oct. 16, 2015

(65) Prior Publication Data

US 2016/0202794 A1    Jul. 14, 2016

(30) Foreign Application Priority Data

Jan. 8, 2015    (KR) .......................... 10-2015-0002723

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ............................... G06F 3/0412; G06F 3/044
See application file for complete search history.

(56) References Cited

U.S. PATENT DOCUMENTS

| | | |
|---|---|---|
| 2011/0096251 A1 | 4/2011 | Son et al. |
| 2011/0109622 A1 | 5/2011 | Son et al. |
| 2011/0228181 A1 | 9/2011 | Jeong et al. |
| 2012/0162550 A1 | 6/2012 | Jeong et al. |
| 2012/0242615 A1* | 9/2012 | Teraguchi ............. G06F 3/0412 345/174 |
| 2012/0293452 A1 | 11/2012 | Tun et al. |
| 2013/0155059 A1* | 6/2013 | Wang ....................... G06F 3/041 345/419 |
| 2013/0271388 A1 | 10/2013 | Chu et al. |
| 2013/0301195 A1* | 11/2013 | Yeh ....................... G06F 3/0412 361/679.01 |

(Continued)

FOREIGN PATENT DOCUMENTS

| | | |
|---|---|---|
| CN | 102231032 | 11/2011 |
| CN | 102262478 | 11/2011 |

*Primary Examiner* — Chun-Nan Lin
(74) *Attorney, Agent, or Firm* — F. Chau & Associates, LLC

(57) ABSTRACT

An optical system includes a first panel that includes a plurality of first electrodes; a second panel facing the first panel and that includes a plurality of second electrodes; and an optical conversion layer positioned between the first panel and the second panel that includes an optical conversion material. An electric field generated in the optical conversion layer by the plurality of first electrodes and the plurality of second electrodes in a multi-view mode generates a phase difference in the optical conversion layer based on a location of the optical conversion material. The plurality of second electrodes includes a plurality of sub electrodes and a common electrode, and the plurality of first electrodes and the common electrode forms a touch sensing capacitor to sense a touch in a touch mode.

8 Claims, 22 Drawing Sheets

(56) References Cited

U.S. PATENT DOCUMENTS

2014/0043288 A1* 2/2014 Kurasawa ........... G02F 1/13338
  345/174
2014/0333582 A1* 11/2014 Huo .................... G02F 1/13338
  345/174

* cited by examiner

Touch mode

TOUCH SENSIBLE OPTICAL SYSTEM AND DISPLAY DEVICE INCLUDING THE SAME

CROSS-REFERENCE TO RELATED APPLICATION

This application claims priority under 35 U.S.C. § 119 from Korean Patent Application No. 10-2015-0002723 filed in the Korean Intellectual Property Office on Jan. 8, 2015, and all the benefits accruing therefrom, the contents of which are herein incorporated by reference in their entirety.

BACKGROUND

(a) Technical Field

Embodiments of the present disclosure are directed to a touch sensible optical system and a display device including the same.

(b) Description of the Related Art

Display devices that can display a 3D image or enable users at different locations to observe (multi-view) different images have recently attracted public attention.

In general, a 3D image display technology enables a viewer to perceive objects in 3D using binocular parallax, the primary factor for perceiving 3D at short distances. That is, when different 2D images are seen by a left eye and a right eye, and the image seen by the left eye, hereinafter referred to as the "left eye image", and the image seen by the right eye, hereinafter referred to as the "right eye image", are transmitted to a brain, the left eye image and the right eye image are merged to be perceived as a 3D image.

A 3D image display device which uses the binocular parallax may be a stereoscopic 3D image display device, which uses glasses, such as shutter glasses, polarized glasses, etc., or an autostereoscopic 3D image display device which uses optical systems, such as lenticular lenses, parallax barriers, etc., instead of glasses.

A multi-view display device can also use a similar method as a 3D image display device so that observers at different locations perceive different images.

Among the multi-view display devices, an autostereoscopic 3D image display device or a display device that uses a lens can display images at different views by using a lens positioned between a display panel and the observer to separate and display a 3D image or a multi-view image at various views by changing an optical path of an image for each view. An autostereoscopic 3D image/multi-view display device that uses a lens can display an image having higher luminance than a display device that uses a barrier.

Recent display devices may be touch sensitive to interact with a user in addition to displaying an image. A touch sensing function can determine contact information such as whether an object is touching a screen and a touch location thereof by sensing a change in pressure, charges, light, etc., which are applied to the screen in the display device, such as when a user writes text or draws a figure by touching the screen with a finger or a touch pen. The display device can receive an image signal based on touch information.

A touch sensing function can be implemented by a sensor. The sensor may be classified as one of various types such as a resistive type, a capacitive type, an electromagnetic (EM) type, an optical type, etc.

Among the types, a capacitive type touch sensor includes a sensing capacitor comprised of a plurality of sensing electrodes which can transmit the sensing signal, and can determine whether there is a touch, and a touch position, etc., by sensing a change in a capacitance of the sensing capacitor, which occurs when a conductor such as a finger approaches the touch sensor.

SUMMARY

Embodiments of the present disclosure can provide improved thickness, weight, etc. of a display device having a touch sensing function and a multi-view image display function.

Embodiments of the present disclosure can provide an improved touch sensing function for a display device having a touch sensing function and a multi-view image display function.

Exemplary embodiments of the present disclosure can achieve other objects which are not mentioned in detail in addition to the objects.

An exemplary embodiment of the present disclosure provides an optical system including: a first panel that includes a plurality of first electrodes; a second panel facing the first panel and that includes a plurality of second electrodes; and an optical conversion layer positioned between the first panel and the second panel that includes an optical conversion material, where an electric field generated in the optical conversion layer by the plurality of first electrodes and the plurality of second electrodes in a multi-view mode generates a phase difference in the optical conversion layer based on a location of the optical conversion material, the plurality of second electrodes includes a plurality of sub electrodes and a common electrode, and the plurality of first electrodes and the common electrode forms a touch sensing capacitor to sense a touch in a touch mode.

Herein, the second panel may include a first insulating layer positioned between the plurality of sub electrodes and the common electrode, and the first insulating layer may include an organic insulating material.

The plurality of sub electrodes may include a plurality of upper electrodes and a plurality of lower electrodes positioned on different layers.

The common electrode may include a first common electrode positioned at a center of a unit lens and one first common electrode is provided per unit lens.

The first common electrode may include a transparent conductive material that includes at least one of indium tin oxide (ITO), indium zinc oxide (IZO), graphene, and a metal nanowire, and may be connected to a bus line most adjacent to a lens area.

The first common electrode and a bus line may be positioned on the same layer.

The common electrode may include second common electrodes positioned at both sides of the first common electrode with the first common electrode interposed therebetween.

The second common electrode may include a transparent conductive material and may be positioned on a different layer from the bus line, and the first common electrode and the second common electrode may be connected to the bus line.

The common electrode may be positioned among the plurality of sub electrodes, and both sides of the common electrode may be spaced apart from the plurality of sub electrodes by a predetermined distance.

Another exemplary embodiment of the present disclosure provides a display device including: a display panel; an optical system facing the display panel; and a graphic controller for controlling the display panel and the optical system, where the optical system includes a first panel that includes a plurality of first electrodes, a second panel facing the first panel and that includes a plurality of second electrodes, and an optical conversion layer positioned between the first panel and the second panel that includes an optical conversion material, where an electric field generated in the optical conversion layer by the plurality of first electrodes and the plurality of second electrodes in a multi-view mode generates a phase difference in the optical conversion layer based on a location of the optical conversion material, the plurality of second electrodes includes a plurality of sub electrodes and a common electrode, and the plurality of first electrodes and the common electrode forms a touch sensing capacitor to sense a touch in a touch mode.

Herein, the second panel may include a first insulating layer positioned between the plurality of sub electrodes and the common electrode, and the first insulating layer may include an organic insulating material.

The common electrode may include a first common electrode positioned at a center of a unit lens and one first common electrode is provided per unit lens.

The first common electrode may include a transparent conductive material that includes at least one of indium tin oxide (ITO), indium zinc oxide (IZO), graphene, and a metal nanowire, and may be connected to a bus line most adjacent to a lens area.

The first common electrode and a bus line may be positioned on the same layer.

The common electrode may include second common electrodes positioned at both sides of the first common electrode with the first common electrode interposed therebetween.

The second common electrode may include a transparent conductive material and may be positioned on a different layer from the bus line, and the first common electrode and the second common electrode may be connected to the bus line.

The common electrode may be positioned among the plurality of sub electrodes, and both sides of the common electrode may be spaced apart from the plurality of sub electrodes by a predetermined distance.

Another exemplary embodiment of the present disclosure provides an optical system, including a first panel that includes a plurality of first electrodes arranged in a first direction; and a second panel facing the first panel and that includes a plurality of second electrodes arranged in a different, second direction, where the plurality of second electrodes includes a plurality of sub electrodes and a common electrode, the plurality of sub electrodes includes a plurality of upper electrodes and a plurality of lower electrodes positioned on different layers, the common electrode includes a first common electrode positioned at a center of a unit lens and one first common electrode is provided per unit lens, and the common electrode is positioned among the plurality of sub electrodes, and both sides of the common electrode are spaced apart from the plurality of sub electrodes by a predetermined distance.

The optical system may further include an optical conversion layer positioned between the first panel and the second panel that includes an optical conversion material, where an electric field generated in the optical conversion layer by the plurality of first electrodes and the plurality of second electrodes in a multi-view mode may change a phase difference in the optical conversion layer based on a location of the optical conversion material, and the plurality of first electrodes and the common electrode may form a touch sensing capacitor to sense a touch in a touch mode.

The first common electrode may connected to a bus line most adjacent to a lens area, the first common electrode and the bus line may be positioned on a same layer, and the common electrode may include second common electrodes positioned at both sides of the first common electrode with the first common electrode interposed therebetween.

According to exemplary embodiments of the present disclosure, the thickness, the weight, a touch sensing function, and the like of a display device having a touch sensing function and a multi-view image display function can be improved.

DETAILED DESCRIPTION OF EXEMPLARY EMBODIMENTS

Figure 1:
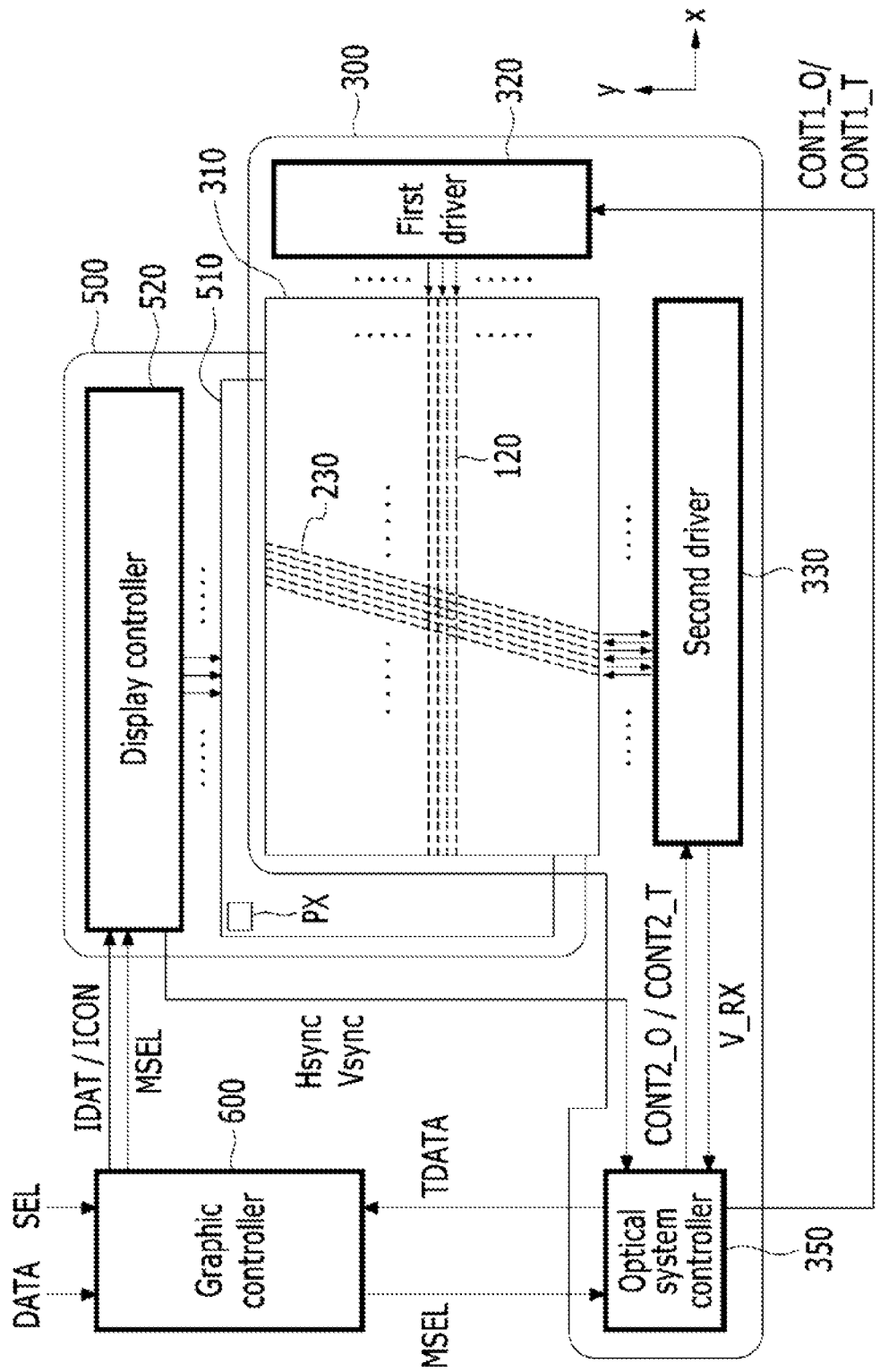
FIG. 1 is a block diagram of a display device that includes an optical system according to an exemplary embodiment of the present disclosure.

Exemplary embodiments of the present disclosure will be described more fully hereinafter with reference to the accompanying drawings, so that those skilled in the art easily perform the exemplary embodiments of the disclosure. As those skilled in the art would realize, the described embodiments may be modified in various different ways, all without departing from the spirit or scope of the present disclosure. Like reference numerals may designate like elements throughout the specification.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present.

Throughout this specification and the claims that follow, when it is described that an element is "coupled" to another element, the element may be "directly coupled" to the other element or "electrically coupled" to the other element through a third element.

Hereinafter, a touch sensible optical system and a display device including the same according to exemplary embodiments of the present disclosure will be described in detail with reference to the accompanying drawings.

FIG. 1 is a block diagram of a display device that includes an optical system according to an exemplary embodiment of the present disclosure.

Referring to FIG. 1, a display device according to an exemplary embodiment of the present disclosure includes an optical system 300 having a touch sensing function, an optical system controller 350 for controlling the optical system 300, a display panel 500 for displaying an image, and a graphic controller 600 for controlling all of them.

A display device according to an exemplary embodiment of the present disclosure may operate differently according to at least two display modes. For example, a display device according to an exemplary embodiment of the present disclosure may operate in a 2D image display mode to display a 2D image or may operate in a multi-view mode to display a 3D image or different images on different views. When a display device operates in 2D image display mode, the display device may use a touch sensing function to sense an external touch based on a touch mode selection.

The display panel 500 may be one of various display panels, such as a liquid crystal display panel, an organic light emitting display panel, etc. The display panel 500 may be a flexible display panel which is foldable, bendable, rollable, stretchable and compressible, or a rigid type display panel.

The display panel 500 may include a display area 510 in which an image can be displayed and a non-display area that does not display the image. The display area 510 includes a plurality of pixels PX and a plurality of signal lines connected thereto. The plurality of pixels PX may be arranged substantially in a matrix pattern. The signal lines include a plurality of gate lines that transmit gate signals and a plurality of data lines that transmit data voltages.

The display panel 500 may be a light receiving display device such as a liquid crystal display panel or a self-light emitting display device such as an organic light emitting display panel. When the display panel 500 is a light receiving display device, the display panel 500 may further include a backlight that supplies light. Further, the display panel 500 may include at least one polarizer. When the display panel 500 is a liquid crystal display panel, the display panel 500 may include a liquid crystal layer that can operate in various modes. For example, the operating modes of a liquid crystal display panel may include plane to line switching (PLS), in plane switching (IPS), twisted nematic (TN), super TN (STN), vertically aligned (VA) modes, etc.

The display panel 500 may include pixels PX that display three primary colors such as RGB and may further include a pixel PX that displays a white color in addition to the RGB pixels.

The display panel 500 may include a display controller 520 for controlling and driving the display panel 500 or be connected to the display controller 520 through a flexible printed circuit board. When the display controller 520 is included in the display panel 500, the display controller 520 may be integrated in the display panel 500 or attached to the display panel 500 in a form of an integrated circuit chip.

The display controller 520 may include, for example, a gate driver that generates gate signals and transmits the gate signals to the gate lines, a data driver that generates data voltages and transmits the data voltages to the data lines, a signal controller for controlling them, etc. When the display panel 500 includes a backlight, such as a liquid crystal display, the display controller 520 may further include a backlight driver for controlling turn-on and off of the backlight.

The display controller 520 may provide a signal to the display panel 500 for the pixels PX of the display panel 500 to display a 2D image in 2D image display mode, and some pixels PX of the display panel 500 may display an image of a first view and some of the other pixels PX may display an image of a different, second view during one frame in the multi-view mode. When a 3D image is to be displayed, the first-view image may be a left eye image and the second-view image may be a right eye image.

The optical system 300 includes an optical panel 310, and a first driver 320 and a second driver 330 for driving the optical panel 310.

The optical panel 310 is positioned in front of a surface of the display panel 500 that displays the image. The optical panel 310 includes a plurality of first electrodes 120 arranged in a first direction and a plurality of second electrodes 230 arranged in a different, second direction. For example, as illustrated in FIG. 1, the plurality of first electrodes 120 may be arranged substantially in a y-axis direction and the plurality of second electrodes 230 may be arranged substantially in an x-axis direction. In particular, the second electrodes 230 may extend in an direction oblique to the y-axis direction, and may cross the first electrodes 120.

The optical panel 310 passes the image displayed by the display panel 500, however, the optical panel 310 may be driven differently according to the display mode. In 2D image display mode, the optical panel 310 may display the image displayed by the display panel 500 unchanged without dividing the image into multi-view images. Further, in 2D image display mode, the optical panel 310 may to sense a touch according to a selection of the touch mode. In a multi-view mode, the optical panel 310 may form a plurality of lenses by implementing phase differences that differ as a function of location. As a result, in multi-view mode, the optical panel 310 may separate and send images that correspond to respective points of time at different points of time.

The first driver 320 may apply voltages to the first electrodes 120. In a 2D touch mode, the first driver 320 may apply a touch input voltage while scanning the plurality of first electrodes 120 in the y-axis direction. In a multi-view mode, the first driver 320 may apply a constant voltage to all of the plurality of first electrodes 120, but embodiments of the present disclosure are not limited thereto. In multi-view mode, the constant voltage applied to the first electrode 120 may be common voltage Vcom.

The second driver 330 may apply voltages to the second electrode 230 or receive touch output voltages from the second electrode 230. In a 2D touch mode, the second driver 330 may receive and process a touch output voltage from the plurality of second electrodes 230. In a multi-view mode, the second driver 330 may cause the optical panel 310 to form a lens that may change an optical path of the image displayed by the display panel 500 by applying predetermined voltages that are functions of the locations of the plurality of second electrodes 230.

The first driver 320 and the second driver 330 may be integrated in or attached to the optical panel 310 or connected to the optical panel 310 through a flexible printed circuit board.

The optical system controller 350 is connected with the optical system 300 to control the optical system 300. The optical system controller 350 may receive a mode selection signal MSEL from the graphic controller 600 and control the optical system 300 based thereon. In detail, when multi-view mode is selected, the optical controller 350 sends a first multi-view control signal CONT1_O to the first driver 320 and a second multi-view control signal CONT2_O to the second driver 330. When touch mode is selected, the optical controller 350 sends a first touch control signal CONT1_T to the first driver 320 and a second touch control signal CONT2_T to the second driver 330.

The optical system controller 350 may also receive a touch output voltage V_Rx from the second driver 330 and may perform processing such as A/D conversion of the received touch output voltage V_Rx to generate digital touch data TDATA and sends the generated digital touch data TDATA to the graphic controller 600. To this end, the optical system controller 350 may include a memory, an A/D converter, an information processing circuit, a low-frequency pass filter, etc.

The graphic controller 600 receives externally generated image information DATA and mode selection information SEL.

The mode selection information SEL includes information regarding whether the display device will operate in 2D image display mode, and operate in touch mode and operate in multi-view mode.

The graphic controller 600 processes the image information DATA based on the image information DATA and the mode selection information SEL to generate an input control signal ICON to control display of an input image signal IDAT and an input image signal IDAT. The graphic controller 600 sends the input image signal IDAT and the input control signal ICON to the display controller 520. The graphic controller 600 receives the touch data TDATA from the optical controller 350 and processes the image information DATA based thereon to generate the input image signal IDAT.

The graphic controller 600 generates the mode selection signal MSEL according to the mode selection information SEL and sends the generated mode selection signal MSEL to the optical system controller 350 and the display controller 520.

The optical system 300 should operate in synchronization with the display panel 500. To this end, the optical system controller 350 may operate by receiving a vertical synchronization signal Vsync and a horizontal synchronization signal Hsync from the display controller 520.

Then, referring to FIGS. 2 to 5 together with FIG. 1, a detailed structure of the optical panel 310 of the optical system 300 according to an exemplary embodiment of the present disclosure will be described.

Figure 2:
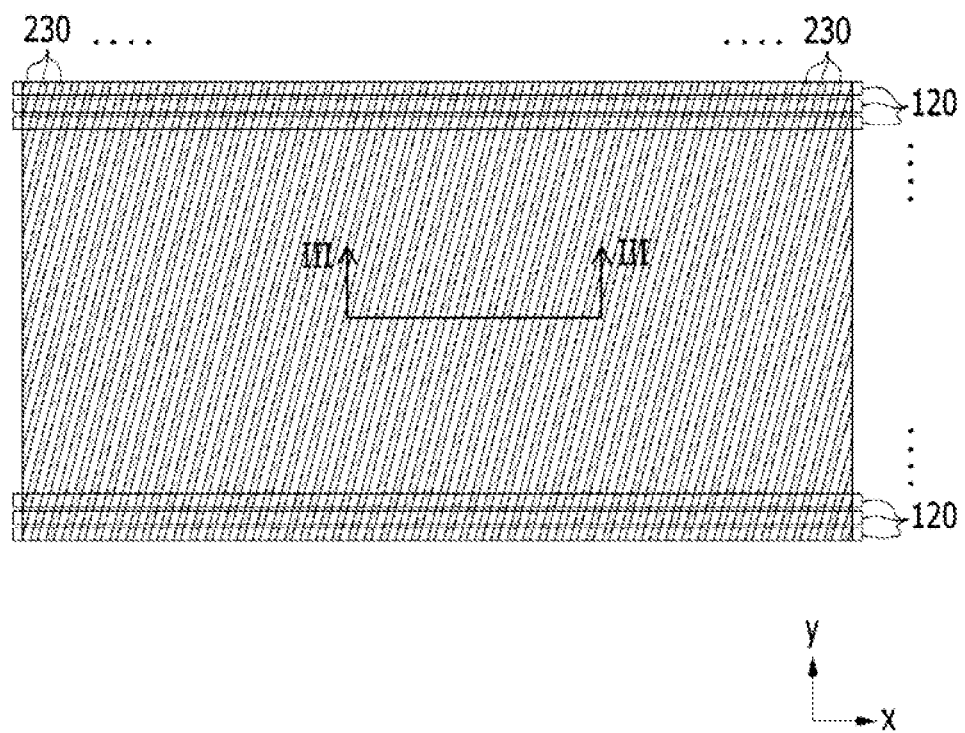
FIG. 2 is a plan view of an optical panel according to an exemplary embodiment of the present disclosure.
Figure 3:
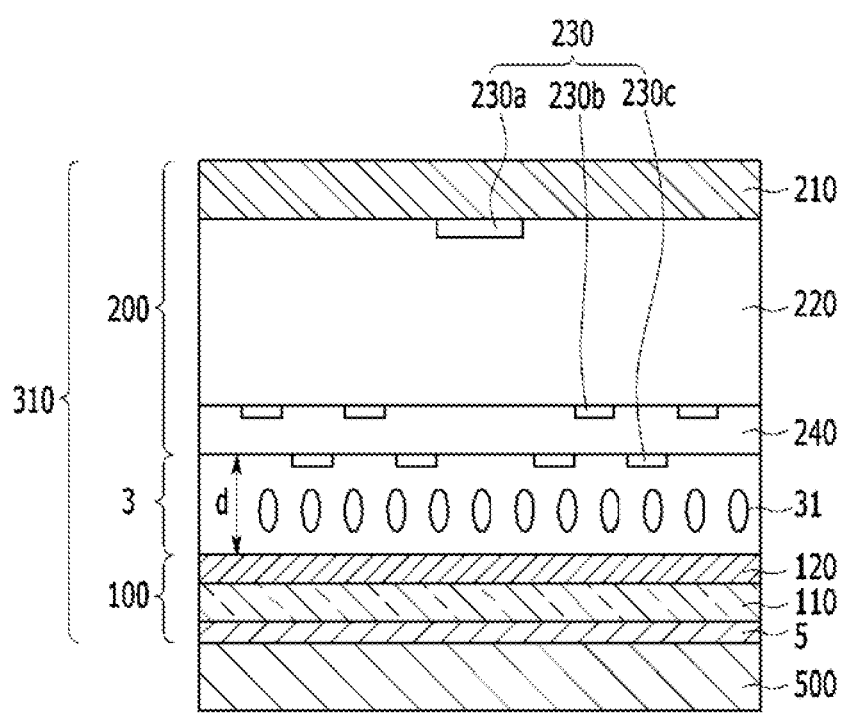
FIGS. 3 to 5 are cross-sectional views of an optical system taken along line of FIG. 2.
Figure 4:
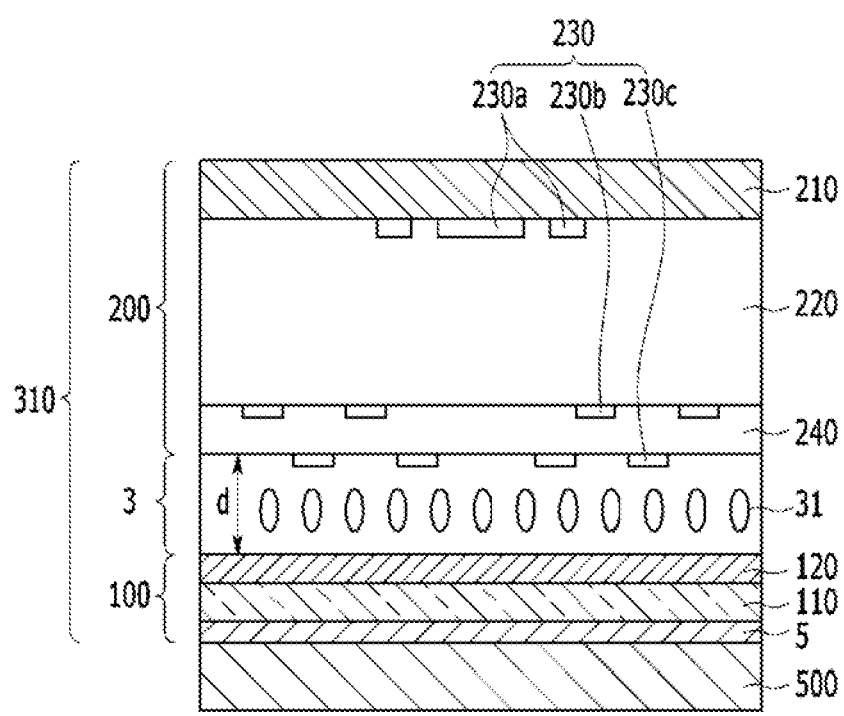
Figure 5:
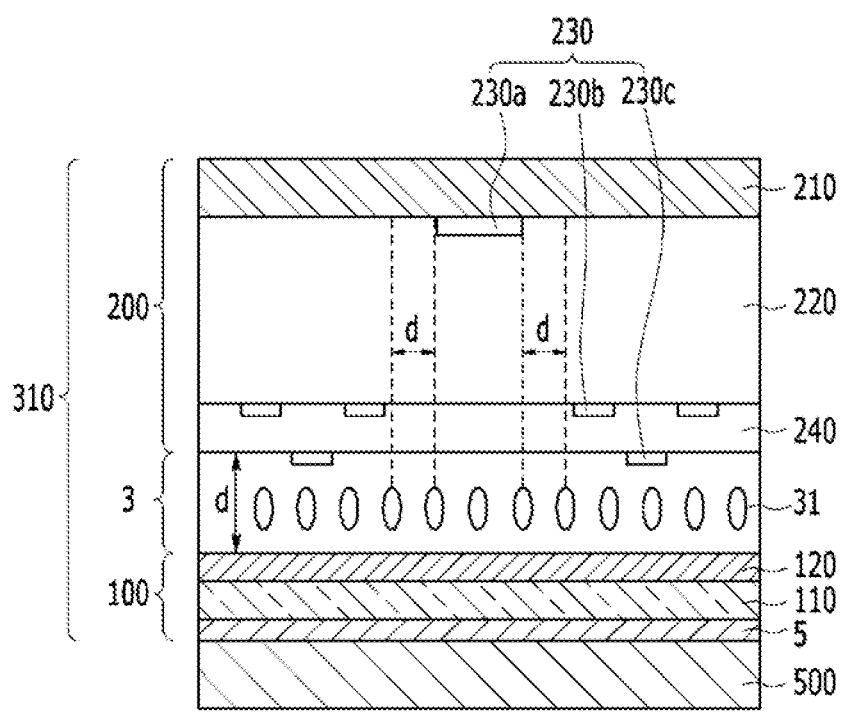

FIG. 2 is a plan view of an optical panel according to an exemplary embodiment of the present disclosure. FIGS. 3 to 5 are cross-sectional views of an optical system taken along line of FIG. 2.

Referring to FIG. 2, the optical panel 310 according to an exemplary embodiment of the present disclosure includes the plurality of first electrodes 120 arranged in a first direction in a plan view and the plurality of second electrodes 230 arranged in a different second direction as described above. For example, as illustrated in FIG. 2, the plurality of first electrodes 120 may be arranged substantially in the y-axis direction and the plurality of second electrodes 230 may be arranged substantially in the x-axis direction. In particular, the second electrode 230 extends in a direction oblique to the y-axis direction to prevent moiré patterns from occurring between the second electrode 230 and the display panel 500.

The first electrodes 120 may be respectively separated or a predetermined number of neighboring first electrodes 120 may be electrically connected with each other to receive substantially the same voltage.

Referring to FIG. 3, the optical panel 310 according to an exemplary embodiment of the present disclosure may be positioned in front of the surface of the display panel 500 that displays the image. The optical panel 310 may be attached to the display panel 500 through adhesives 5 such as an optical clear adhesive (OCA), an optical clear resin (OCR), a pressure sensitivity adhesive (PSA), etc.

The optical panel 310 may include a lower panel 100 and an upper panel 200 that face each other and an optical conversion layer that is positioned therebetween and that includes an optical conversion material. For example, the optical conversion material may be a liquid crystal material, an electrophoretic material, an organic light emitting material, etc. In an exemplary embodiment, the optical conversion layer is described as a liquid crystal layer 3, but the optical conversion layer is not limited thereto.

The lower panel 100 includes a first substrate 110. The first substrate 110 may include various plastic materials, such as PC (polycarbonate), PMMA (poly(methyl methacrylate)), PET (Polyethylene terephthalate), etc., or inorganic materials such as glass, sapphire, etc.

A plurality of first electrodes 120 is positioned on the first substrate 110. The first electrode 120 may receive the common voltage Vcom when the display device operates in multi-view mode, and may receive a touch input voltage and be used as a sensing input electrode Tx when the display device operates in touch mode. The first electrode 120 may include transparent conductive materials such as ITO (indium tin oxide), IZO (indium zinc oxide), grapheme, a metal nanowire, etc.

The first electrodes 120 together with the second electrodes 230 of the upper panel 200 may form an electric field in the liquid crystal layer 3, and the electric field has a vertical component substantially vertical to the surface of the lower panel 100 or the upper panel 200.

The upper panel 200 includes a second substrate 210. The second substrate 210 may include various plastic materials including PC, PMMA, PET, etc., or the inorganic materials such as glass, sapphire, etc.

A second electrode 230 positioned on the second substrate 210 may be a common electrode 230a that is used as a sensing output electrode Rx. The common electrode 230a may form an electric field in the liquid crystal layer 3 together with the first electrode 120. As a result, various optical elements, such as a lens, may be formed that can control phase differences of the liquid crystal layer 3 and converting the light path. The common electrode 230a together with the first electrode 120 forms a touch sensing capacitor in touch mode to transmit a touch output voltage that depends on the touch.

Figure 6:
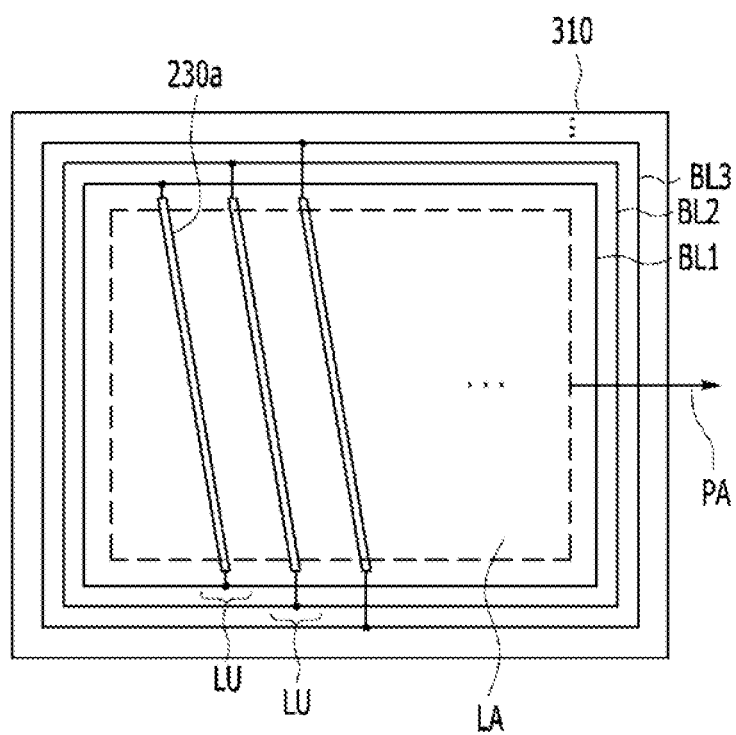
FIGS. 6 to 9 are plan views of an optical panel according to an exemplary embodiment of the present disclosure.
Figure 7:
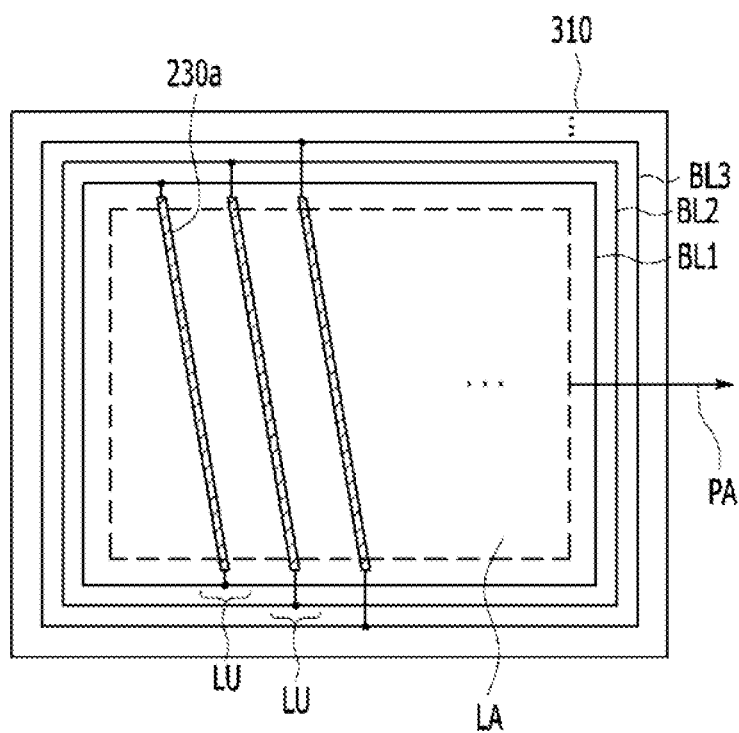
Figure 8:
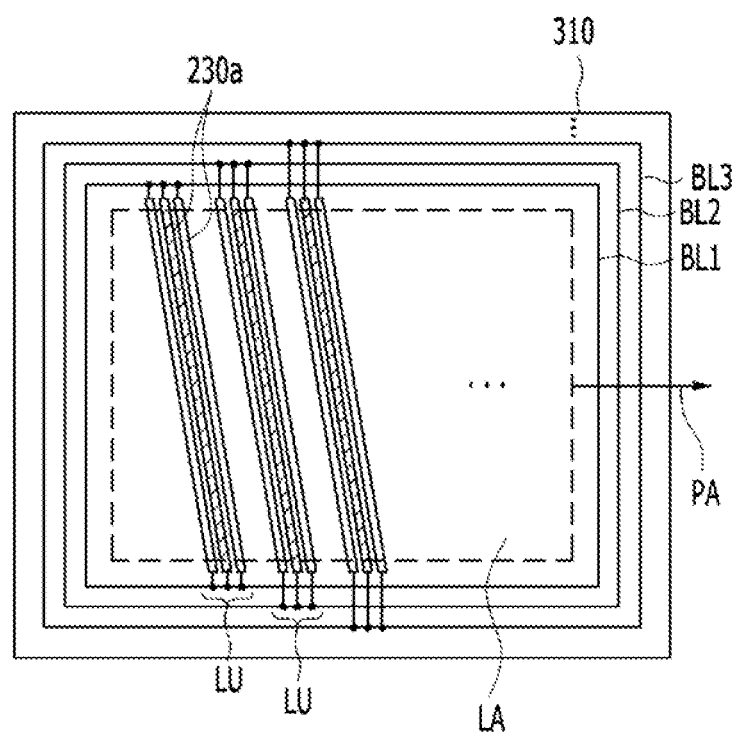
Figure 9:
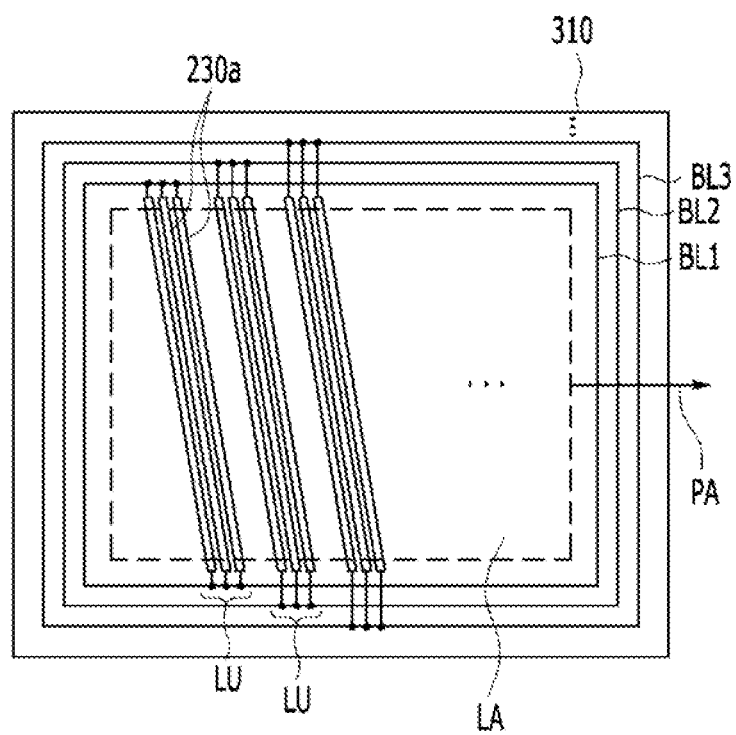

One or more common electrodes 230a may be included in unit lenses defined by periodically dividing a lens area LA at a predetermined intervals. For example, as illustrated in FIGS. 6 and 7, one common electrode 230a may be included in a unit lens LU, and as illustrated in FIGS. 8 and 9, three common electrodes 230a may be included in a unit lens LU.

The unit lens LU may include a plurality of second electrodes 230, including the common electrode 230a, and may be configured by a cycle unit of 3 to 5 mm.

The second electrode 230 includes the common electrode 230a and sub electrodes 230b and 230c. The sub electrodes 230b and 230c do not sense output in touch mode as the electrodes are used in the liquid crystal lens in multi-view mode.

The common electrode 230a may be formed using a central electrode and electrodes peripheral to the central electrode in the unit lenses LU of the liquid crystal lens.

A first insulating layer 220 is positioned on the common electrode 230a. The insulating layer 220 may include inorganic insulating materials such as silicon nitride (SiNx), silicon oxide (SiOx), etc., or may include an organic film made of a polymer. The first insulating layer 220 may have a thickness of approximately 20000 to 40000 Å, but the thickness of the first insulating layer 220 is not limited thereto.

The first insulating layer 220 may insulate a bus of the optical panel 310 from the second electrodes 230 when the display device operates in multi-view mode, and may lower capacitance by decreasing a distance between the common electrode 230a, the sub electrodes 230b and 230c around the common electrode 230a and the first electrode 120 when the display device operates in touch mode. Accordingly, the first insulating layer 220 may improve the touch sensing function by lowering capacitance between the common electrode 230a, which is used as a sensing output electrode, and the first electrode 120, which is used as a sensing input electrode.

When the common electrode 230a operates in multi-view mode, an electric field is formed in the liquid crystal layer 3 with the first insulating layer 220 interposed therebetween, but when the common electrode 230a is formed using a central electrode and electrodes peripheral to the central electrode, an influence on lens efficiency may be minimized. Accordingly, the common electrode 230a in a unit lens LU may include a sufficient number of peripheral electrodes to minimize a reduction of lens efficiency.

The plurality of sub electrodes 230b and 230c may be positioned on the first insulating layer 220. The sub electrodes 230b and 230c and the common electrode 230a together with the first electrode 120 may form an electric field in the liquid crystal layer 3. As a result, various optical elements capable of controlling phase differences of the liquid crystal layer 3 may form a lens that can convert the light path. When the sub electrodes 230b and 230c operate in touch mode, the sub electrodes 230b and 230c may be not used as sensing output electrode, unlike the common electrode 230a.

The second electrodes 230 may include transparent conductive materials such as ITO, IZO, grapheme, metal nanowires, etc., and may further include a low-resistance conductive material such as a metal to reduce wiring resistance. When the second electrode 230 further includes a metal, the metal may be opaque, and a part made of the metal may form a minute pattern having a relatively small width.

Referring to FIG. 3, the plurality of sub electrodes 230b and 230c may include a plurality of lower electrodes 230c and a plurality of upper electrodes 230b positioned on different layers. The lower electrodes 230c and the upper electrodes 230b may be alternately positioned in the x-axis direction.

A second insulating layer 240 is positioned between the lower electrodes 230c and the upper electrodes 230b. The second insulating layer 240 may be made of an inorganic insulating material such as silicon nitride (SiNx), silicon oxide (SiOx), etc.

The second electrode 230 may have a predetermined constant width and/or interval in the x-axis direction or a varying width and/or interval.

The liquid crystal layer 3 includes a plurality of dielectrically anisotropic liquid crystal molecules 31. The liquid crystal molecules 31 may operate in an electrically controlled birefringence (ECB) mode, a vertical aligned (VA) mode, an optically compensated birefringence (OCB) mode, etc. In addition, an alignment layer may be positioned on inner surfaces of the lower panel 100 and the upper panel 200 to align the liquid crystal molecules 31.

Referring to FIG. 4, the optical system 300 according to an exemplary embodiment is substantially similar to that of an exemplary embodiment illustrated in FIG. 3, except that the number of common electrodes 230a may be different. In an exemplary embodiment illustrated in FIG. 3, the common electrode 230a may be formed by one second electrode 230 in the unit lens LU, and in FIG. 4, the common electrode 230a may be formed by a plurality of second electrodes 230.

The common electrode 230a in FIGS. 3 and 4 may be formed by a central electrode of the unit lens LU and electrodes peripheral to the central electrode, and a width of the central electrode of the common electrode 230a in the x-axis direction may be greater than that of other electrodes.

Referring to FIG. 5, the optical system 300 according to an exemplary embodiment is substantially similar that of the exemplary embodiment illustrated in FIG. 3, except that the number of upper electrodes 230b and/or lower electrodes 230c may be different. In an exemplary embodiment illustrated in FIG. 5, the upper electrode 230b and/or the lower electrode 230c which are adjacent to the common electrode 230a in FIG. 3 are removed, and as a result, both sides of the common electrode 230a are spaced apart from the sub electrodes 230b and 230c by a predetermined distance d. When the upper electrode 230b and/or the lower electrode 230c adjacent to the common electrode 230a are removed, capacitance formed between the common electrode 230a and the first electrode 120 may be reduced. Accordingly, an exemplary embodiment of FIG. 5 may improve performance of a touch sensor.

Methods of forming the common electrode 230a will be described with reference to FIGS. 6 to 9 together with the aforementioned drawings.

FIGS. 6 to 9 are plan views of an optical panel according to an exemplary embodiment of the present disclosure. The optical panel 310 may be divided into a lens area LA that displays a 3D image and a peripheral area PA on the periphery of the lens area LA that does not display an image by controlling a lens shape by an alignment distribution of the liquid crystals. As illustrated in FIGS. 6 to 9, an area inside a dotted line is the lens area LA and an area outside the dotted line is the peripheral area PA.

A plurality of lens electrodes is positioned on the optical panel 310 to form the unit electrode LU and a plurality of unit electrodes LU is disposed in the lens area LA. For clarity, FIGS. 6 to 9 illustrate the common electrode 230*a* but not the upper electrode 230*b* and the lower electrode 230*c*.

A plurality of bus lines BL1 BL2, BL3, . . . may be disposed in the peripheral area PA. Herein, the number of bus lines may vary depending on the number of electrodes that comprise each unit lens LU.

Referring to FIG. 6, one lens electrode of the unit lens LU may be formed as the common electrode 230*a*. The common electrode 230*a* may be a central electrode of the unit lens LU. The common electrode 230*a* may be formed by a process between a process that forms a metallic driving connection terminal between the bus line and the liquid crystal lens, and a process that forms the first insulating layer 220. In this case, the common electrode 230*a* is formed to include the transparent conductive materials such as ITO, IZO, grapheme, metal nanowire, etc. The common electrode 230*a* may be connected to a bus line that is most adjacent to the lens area LA.

Referring to FIG. 7, one lens electrode of the unit lens LU may be formed as the common electrode 230*a*, similar to FIG. 6, but simultaneously with the process that forms the metallic driving connection terminal between the bus line and the liquid crystal lens, so that the common electrode 230*a* may also be made of metal. Accordingly, the common electrode 230*a* and the bus line may be positioned on the same layer. The common electrode 230*a* may be opaque, but have a low resistance, which can alleviate an RC delay of the optical panel 310.

Referring to FIG. 8, one lens electrode of the unit lens LU may be formed as the common electrode 230*a* through a metal forming process similar to that of FIG. 7, but adjacent lens electrodes are also formed as common electrodes 230*a*. FIG. 8 shows three common electrodes 230*a* in the unit lens LU, but the number of common electrodes 230*a* is not limited thereto and a plurality of common electrodes 230*a* may be formed. However, the number of common electrodes 230*a* may be limited to a number that reduces lens efficiency within an allowable range. The central and adjacent common electrodes 230*a* may be formed by separate processes to improve visibility, and as a result, the central and adjacent common electrodes 230*a* may include transparent conductive materials such as ITO, IZO, grapheme, metal nanowire, etc. In this case, the central common electrode 230*a* and the adjacent common electrodes 230*a* may be connected to the same bus lines to operate as a lens electrode, and a same voltage may be applied to the central and adjacent common electrode 230*a*.

Referring to FIG. 9, a plurality of lens electrodes of the unit lens LU may be formed as the common electrodes 230*a*, similar to FIG. 8, but common electrodes 230*a* are all formed by a process other than a metal forming process. The common electrode 230*a* may include transparent conductive materials such as ITO, IZO, graphene, metal nanowire, etc.

Now, a method of operating a liquid crystal display according to an exemplary embodiment of the present disclosure in multi-view mode will be described with reference to FIGS. 10 to 18 together with the drawings described above.

Figure 10:
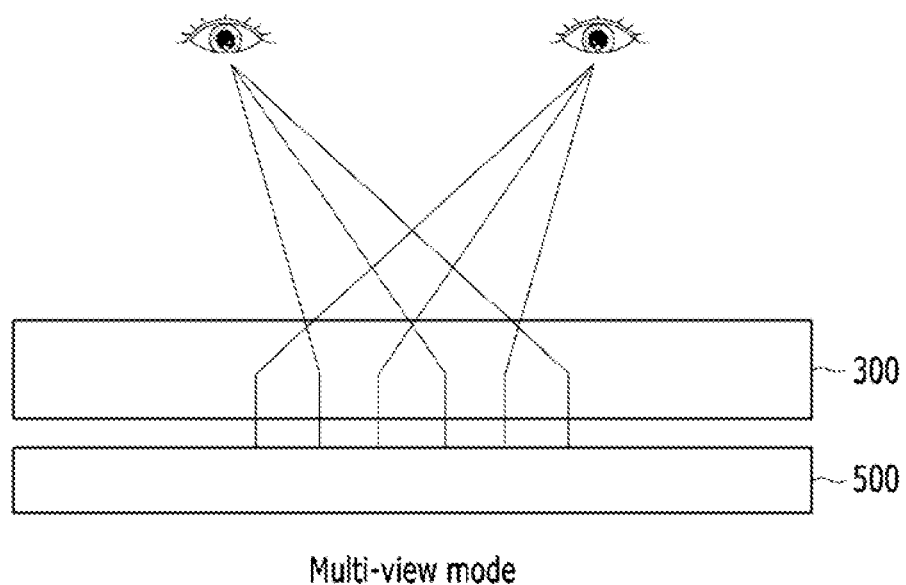
FIG. 10 is a cross-sectional view of a schematic structure of an display device that includes an optical system and a method for displaying a 3D image according to an exemplary embodiment of the present disclosure.
Figure 11:
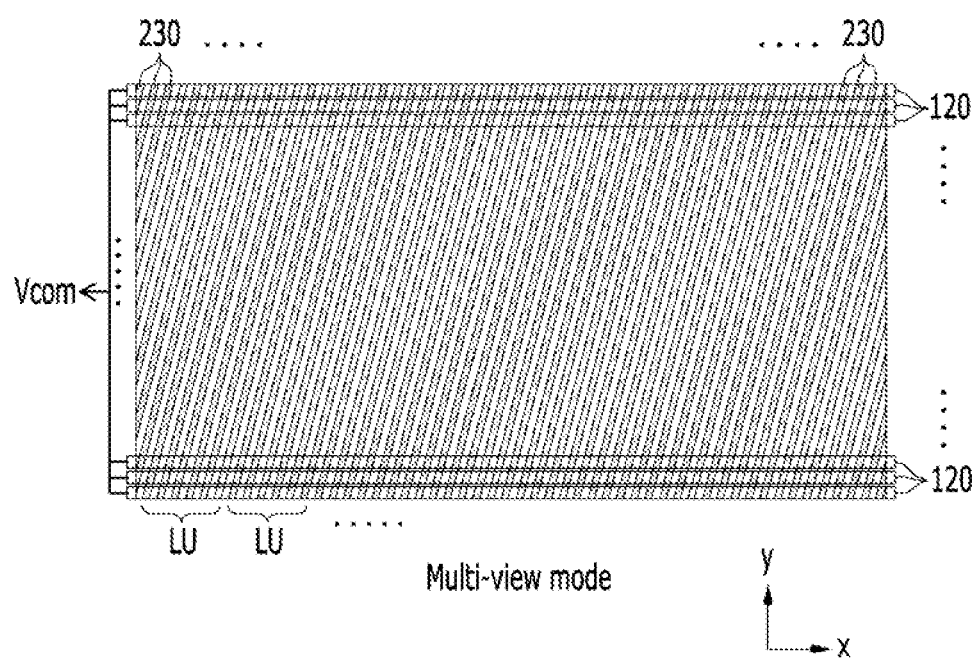
FIG. 11 is a plan view of an optical system according to an exemplary embodiment of the present disclosure.
Figure 12:
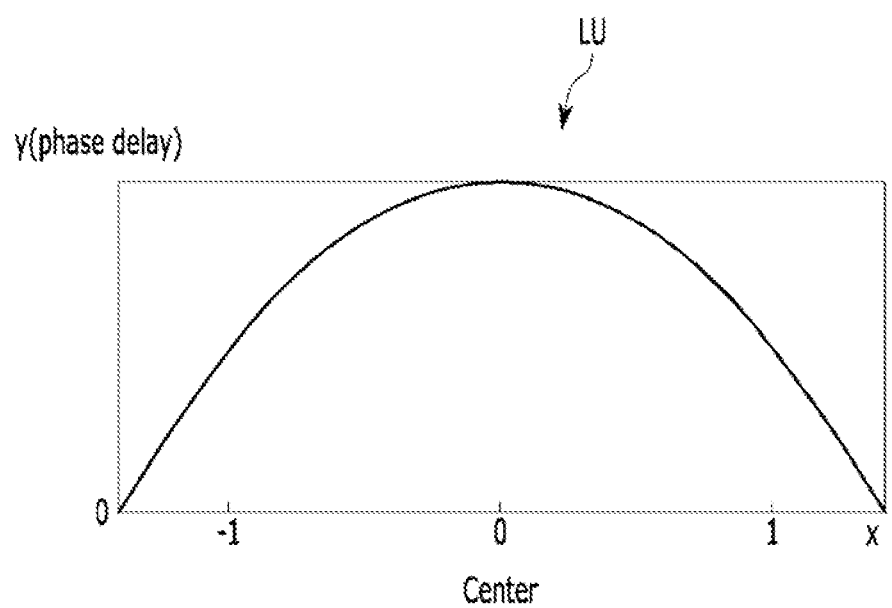
FIGS. 12 to 14 are graphs that illustrate a phase delay as a function of location when the optical system forms a lens according to an exemplary embodiment of the present disclosure.
Figure 13:
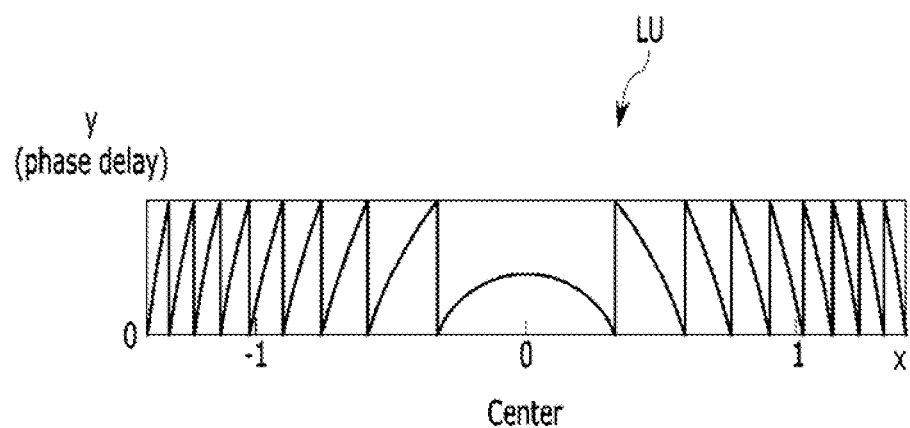
Figure 14:
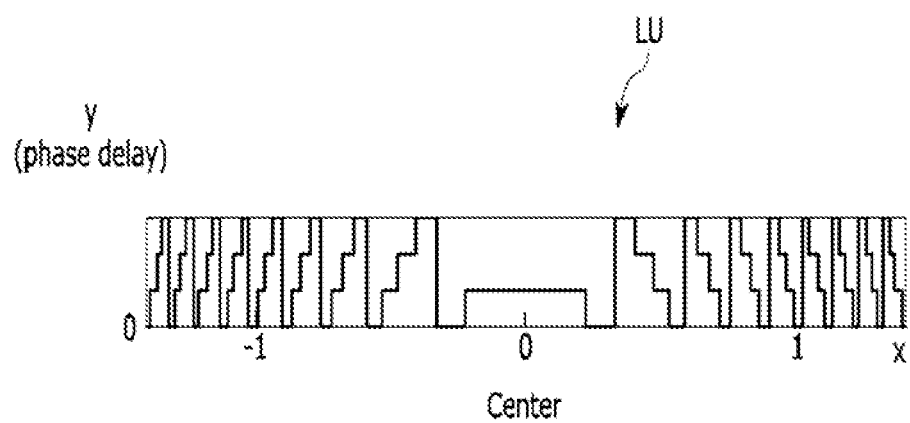
Figure 15:
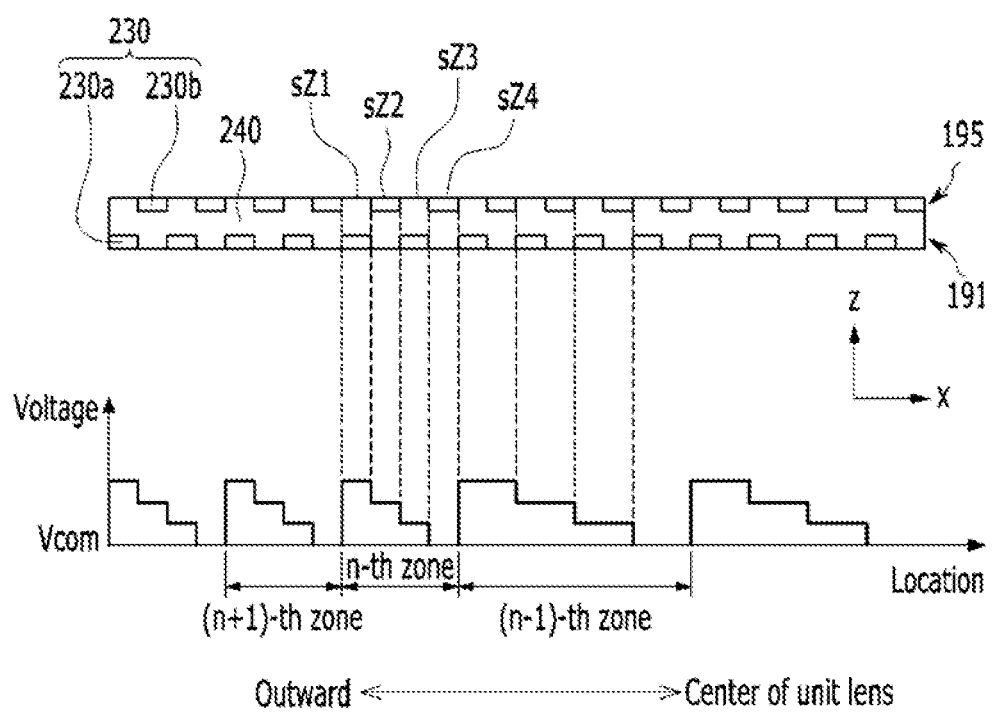
FIG. 15 is a cross-sectional view of a part of an optical system and a diagram that illustrates voltage applied thereto according to an exemplary embodiment of the present disclosure.
Figure 16:
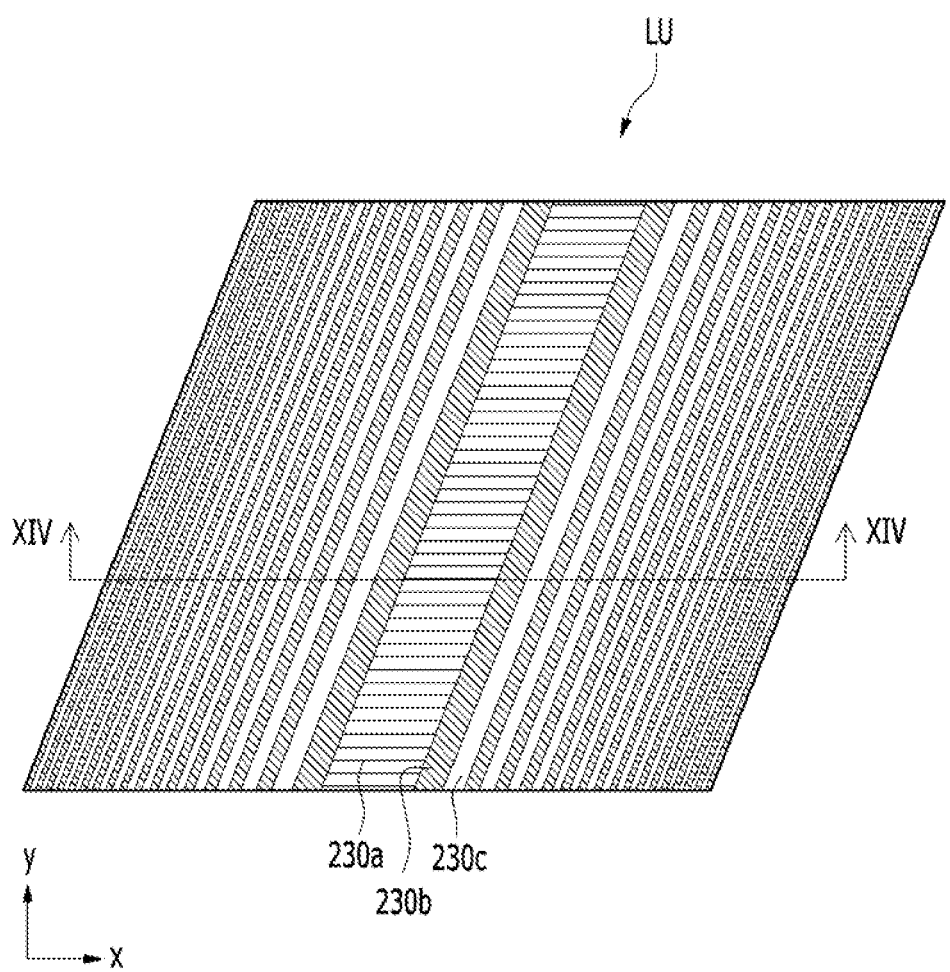
FIG. 16 is a plan view of a unit lens of an optical system according to an exemplary embodiment of the present disclosure.
Figure 17:
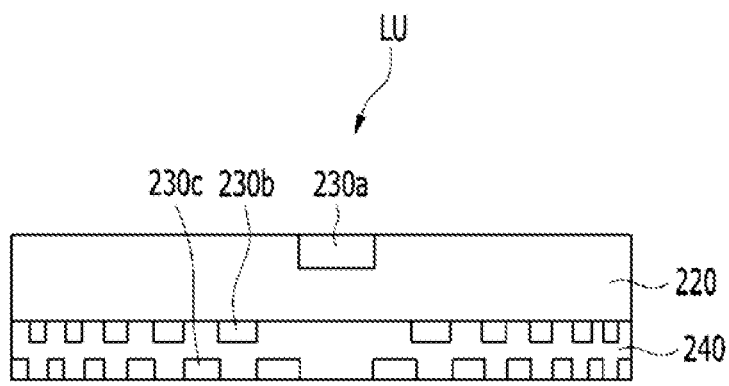
FIG. 17 is a cross-sectional view of a lens unit of an optical system taken along line XIV-XIV of FIG. 16.
Figure 18:
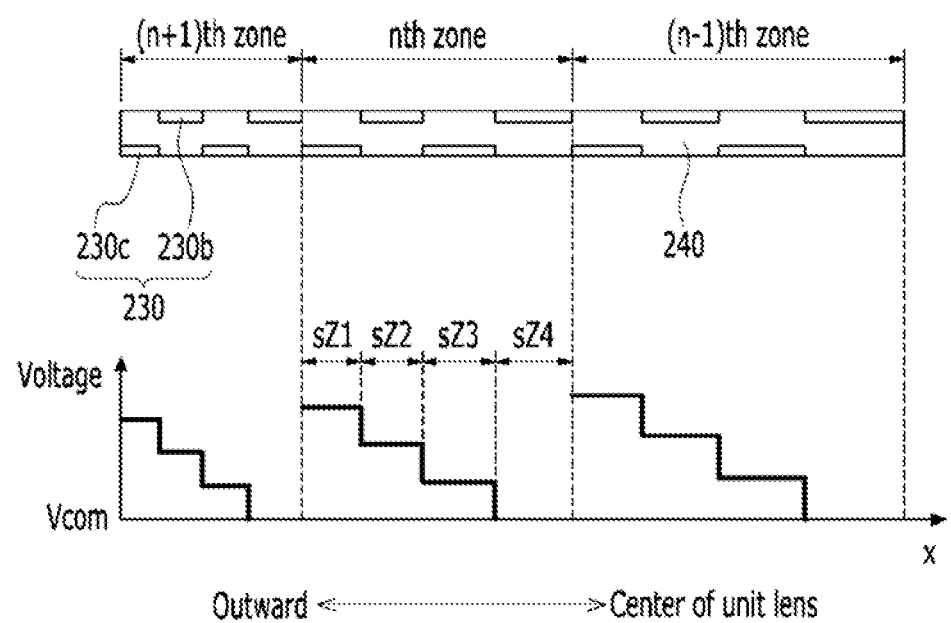
FIG. 18 illustrates electrodes included in an optical system and voltage applied thereto according to an exemplary embodiment of the present disclosure.

FIG. 10 is a cross-sectional view of a schematic structure of a display device including an optical system and a method for displaying a 3D image according to an exemplary embodiment of the present disclosure. FIG. 11 is a plan view of an optical system according to an exemplary embodiment of the present disclosure. FIGS. 12 to 14 are graphs that illustrate a phase delay as a function of location when an optical lens forms a lens according to an exemplary embodiment of the present disclosure. FIG. 15 is a cross-sectional view of a part of the optical system and a diagram illustrating voltage applied thereto according to the exemplary embodiment of the present disclosure. FIG. 16 is a plan view of a unit lens of an optical system according to an exemplary embodiment of the present disclosure. FIG. 17 is a cross-sectional view of a lens unit of an optical system taken along line XIV-XIV of FIG. 16. FIG. 18 illustrates electrodes included in an optical system and voltage applied thereto according to an exemplary embodiment of the present disclosure.

Referring to FIG. 10, a display device according to an exemplary embodiment of the present disclosure includes the display panel 500 and the optical system 300 positioned in front thereof.

When the graphic controller 600 sends the mode selection signal MSEL to the optical system controller 350 and the display panel 500 to select multi-view mode, the optical system controller 350, the optical system 300, and the display panel 500 correspondingly operate in multi-view mode.

The display panel 500 divides and displays the images corresponding to multiple views such as a right eye image, a left eye image, by space division in multi-view mode. In detail, some of the plurality of pixels of the display panel 500 may display an image corresponding to one view and other pixels may display images corresponding to different views. The number of displayed views may be two or more. A plurality of different pixels that display images of the plurality of views may be cyclically arranged in any one direction.

The optical system 300 refracts the image displayed by the display panel 500 in multi-view mode, and as a result, a corresponding image reaches each view to be observed. Voltages are applied to the first electrode 120 and the second electrodes 230, to generate an electric field in the liquid crystal layer 3 so that the optical system 300 may function as the lens. The liquid crystal molecules 31 of the liquid crystal layer 3 are rearranged by the electric field, and as a result, the liquid crystal layer 3 causes different phase delays at different locations to form various lenses.

Referring to FIG. 11, the lens formed by the liquid crystal layer 3 includes a plurality of unit lenses (LU) and each unit lens LU includes a plurality of second electrodes 230. Predetermined voltages for forming various lenses are applied to the plurality of second electrodes 230 included in each unit lens LU. When the second electrode 230 is inclined obliquely to the y-axis direction, the unit lens LU also extends in an inclined direction to the y-axis direction.

The plurality of first electrodes 120 are generally connected to receive the common voltage Vcom.

Referring to FIG. 12, in multi-view mode, a lens generated by the liquid crystal layer 3 of the optical system 300 according to an exemplary embodiment of the present disclosure may be, for example, a GRIN (gradient index) lens.

Referring to FIG. 13, in multi-view mode, the lens generated by the liquid crystal layer 3 of the optical system 300 according to an exemplary embodiment of the present disclosure may be, for example, a Fresnel lens. A Fresnel lens that has optical characteristics of a Fresnel zone plate may be functionally the same as a solid convex lens or a GRIN lens in terms of a valid phase delay as a phase delay distribution is cyclically repeated. A phase modulation type Fresnel zone plate may include a kinoform zone plate, a sinusoidal phase modulation zone plate, a binary phase modulation zone plate, or a multi-level phase modulation zone plate.

FIG. 13 illustrates a phase delay y of a unit lens LU when using a kinoform zone plate.

FIG. 14 illustrates the phase delay y of a unit lens LU when using a multi-level phase modulation zone plate. The unit lens LU illustrated in FIG. 14 is similar to a solid block lens or a GRIN lens in terms of the valid phase delay, but a phase delay value has a step form, and as a result, discontinuous points exist, thereby causing incident light to be diffracted.

Now, referring to FIG. 15 together with FIG. 11, a structure and an operation in multi-view mode of the optical system 300 according to an exemplary embodiment of the present disclosure will be described.

Referring to FIG. 15, the optical system 300 according to an exemplary embodiment of the present disclosure substantially the same as that in the aforementioned exemplary embodiments. FIG. 15 illustrates a part of the optical system 300 other than the center of the unit lens LU at which the common electrode 230a is positioned, and illustrates a structure including the upper electrodes 230b and the lower electrodes 230c positioned on different layers. As illustrated in FIG. 14, since the center of the unit lens LU does not exert a large influence on the phase delay y, an operation in the remaining part of the unit lens LU will be described.

As illustrated in FIG. 15, adjacent upper and lower electrodes 230b and 230c do not overlap with each other. The x-axis widths of the upper and lower electrodes 230b and 230c and/or a gap between the upper and lower electrodes 230b and 230c may be constant regardless of the location. Groups of adjacent upper and lower electrodes 230b and 230c are formed into Fresnel zones. The number of upper and lower electrodes 230b and 230c included in sub zones sZ1, sZ2, sZ3, and sZ4 of a Fresnel zone may vary according to the locations of the zones. Each of the sub zones sZ1, sZ2, sZ3, and sZ4 includes at least one sub electrode 230b or 230c and the number of sub electrodes 230b and 230c included in each zone may gradually decrease outward or away from the center of the unit lens LU. The number of upper and lower electrodes 230b and 230c included in several neighboring Fresnel zones may be equal to each other.

In an exemplary embodiment, to implement a Fresnel zone plate, the same voltage may be applied to upper or lower electrodes 230b or 230c corresponding to the same sub zones sZ1, sZ2, sZ3, and sZ4 in each Fresnel zone. Further, a higher voltage is applied to the upper and lower electrodes 230b and 230c in the sub zones sZ1, sZ2, sZ3, and sZ4 outwardly positioned in each Fresnel zone, and as a result, the phase delay value of the liquid crystal layer 3 may be a step-wise function of location as illustrated in FIG. 14. In this case, the first electrodes 120 may receive the common voltage Vcom.

Referring to FIGS. 16 and 17, the optical system 300 according to an exemplary embodiment of the present disclosure is substantially similar to those in the aforementioned exemplary embodiments. In an exemplary embodiment, in particular, the plurality of second electrodes 230 will be described using a structure that includes the common electrode 230a, the upper electrode 230b, and the lower electrode 230c positioned on different layers, similar to an exemplary embodiment illustrated in FIGS. 3 to 5.

The common electrode 230a, the upper electrodes 230b, and the lower electrodes 230c that belong to a unit lens LU of the optical system 300 according to an exemplary embodiment of the present disclosure may be wider toward the center of the unit lens LU. The common electrode 230a positioned at a location corresponding to the center of each unit lens LU may be the widest. FIG. 17 illustrates an example in which the common electrode 230a is positioned at the center of the unit lens LU.

Referring to FIG. 18, the widths of the upper and lower electrodes 230b and 230c decrease outwards from the center of the unit lens LU. When the unit lens LU is driven to form a Fresnel lens, in particular, a Fresnel lens implementing a multi-level phase modulation zone plate, a step-wise voltage in which the magnitude gradually increases outward from the center of the unit lens LU may be applied to the upper and lower electrodes 230b and 230c of each zone. The same voltage may be applied to the lower and upper electrodes 230c and 230b positioned in the same sub zone sZ1, sZ2, sZ3, or sZ4 in each zones of the Fresnel lens. In this case, the first electrode 120 may receive the common voltage Vcom.

Next, a method in which a display device according to an exemplary embodiment of the present disclosure operates in 2D touch mode will be described with reference to FIGS. 19 to 22 together with the drawings described above.

Figure 19:
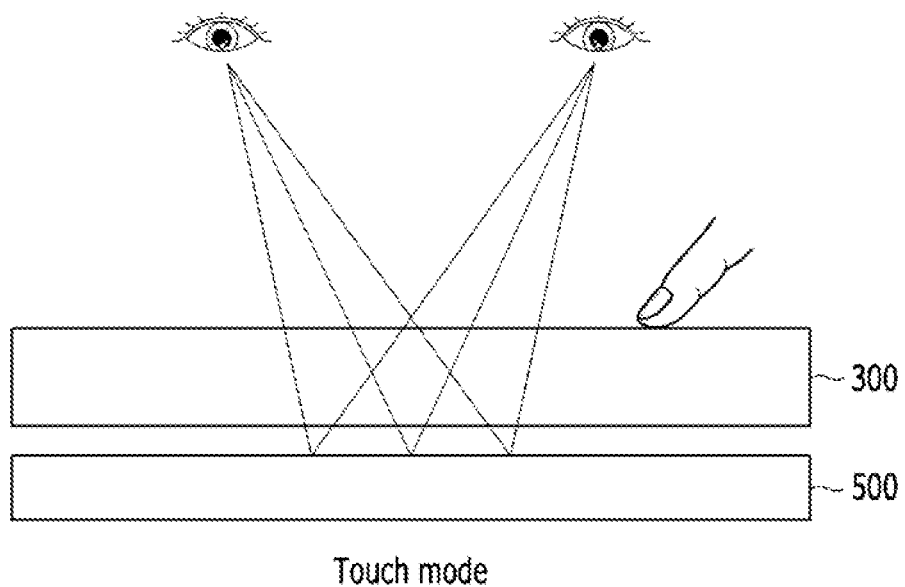
FIG. 19 is a cross-sectional view of a schematic structure of a display device that includes an optical system and a method for displaying a 2D image according to an exemplary embodiment of the present disclosure.
Figure 20:
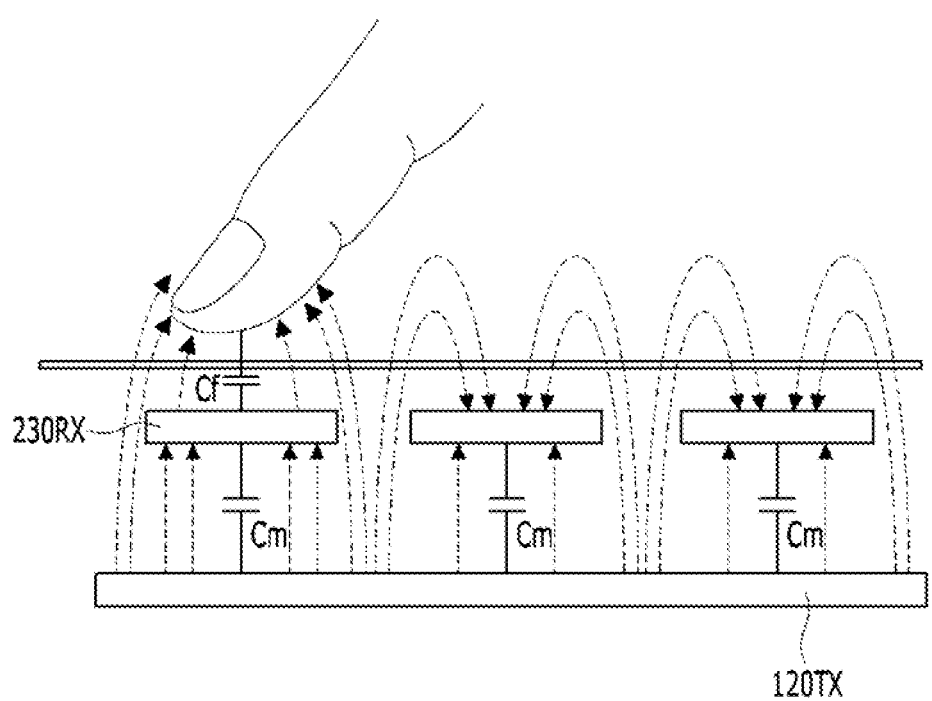
FIG. 20 is a cross-sectional view of a touch sensing method when an optical system has a touch sensing function according to an exemplary embodiment of the present disclosure.
Figure 21:
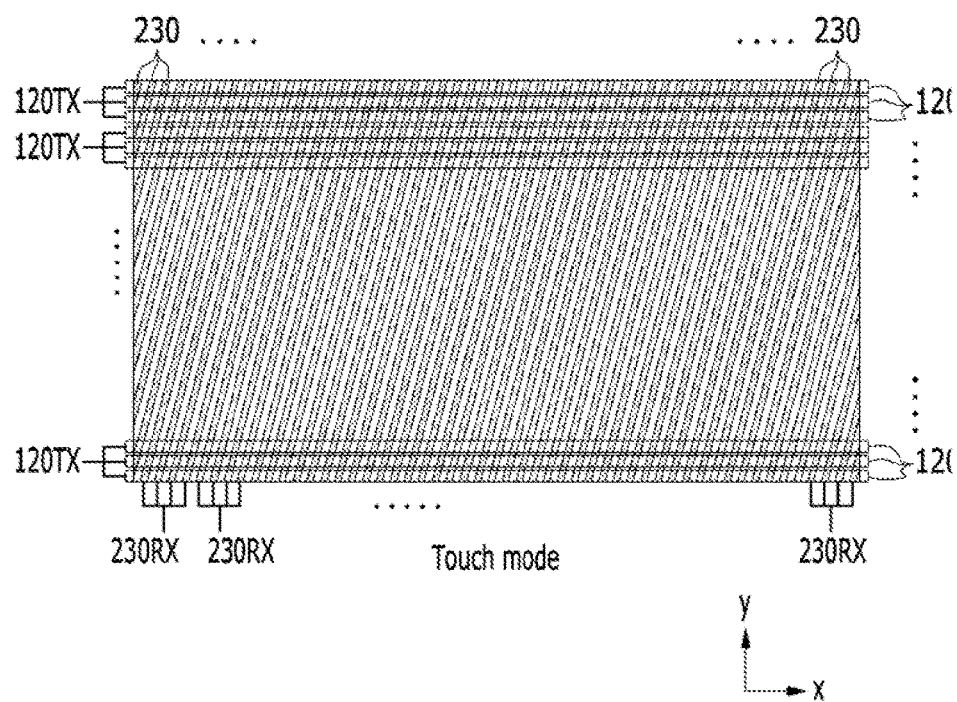
FIGS. 21 and 22 are plan views of an optical system according to an exemplary embodiment of the present disclosure.
Figure 22:
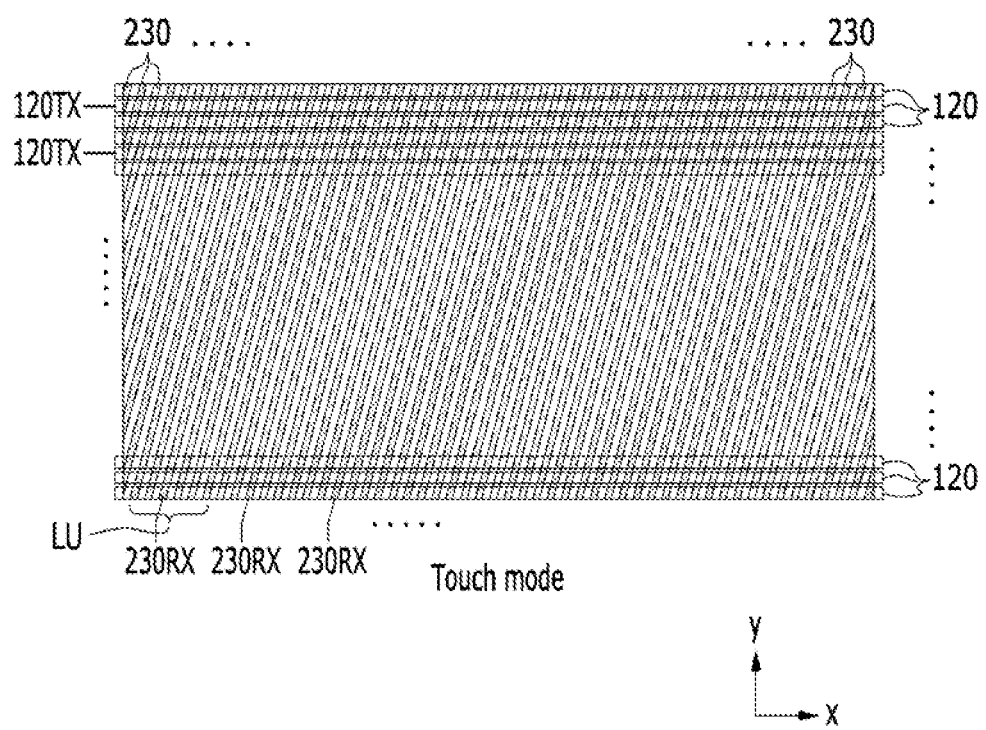

FIG. 19 is a cross-sectional view of a schematic structure of a display device that includes an optical system and a method for displaying a 2D image according to an exemplary embodiment of the present disclosure. FIG. 20 is a cross-sectional view of a touch sensing method when an optical system has a touch sensing function according to an exemplary embodiment of the present disclosure. FIGS. 21 and 22 are plan views of an optical system according to an exemplary embodiment of the present disclosure.

Referring to FIG. 19, a display device according to an exemplary embodiment of the present disclosure includes the display panel 500 and the optical system 300 positioned in front thereof.

When the graphic controller 600 sends the mode selection signal MSEL to the optical system controller 350 and the display panel 500 to select touch mode, the optical system controller 350, the optical system 300, and the display panel 500 correspondingly operate in touch mode.

The display panel 500 may display a 2D image in touch mode.

The optical system 300 does not refract the image displayed by the display panel 500 in touch mode, and as a result, the same image may be observed in all views. That is, a left eye and a right eye of an observer receive the same image to perceive the viewed image as a 2D image.

Referring to FIG. 20, a first sensing electrode 120TX and a second sensing electrode 230RX that cross each other become touch sensing nodes by forming a touch sensing capacitor Cm, which is a mutual capacitor around a cross point thereof.

When an touch input voltage is transmitted to the first sensing electrode 120TX, the touch sensing capacitor Cm is charged with a predetermined amount of charge and thereafter, when a conductor, such as a finger, externally approaches or touches the first sensing electrode 120TX, the conductor and the second sensing electrode 230RX together form a capacitor Cf, and as a result, the amount of charge of the touch sensing capacitor Cm and voltage of the second sensing electrode 230RX change. The changed charge amount or voltage of the second sensing electrode 230RX is output to the second driver 330 as the touch output voltage and processed to acquire touch information.

Each first sensing electrode 120TX may include one or more first electrodes 120. Referring to FIG. 21, a first sensing electrode 120TX may include a plurality of neighboring first electrodes 120 and in this case, the plurality of first electrodes 120 that comprise one first sensing electrode 120TX may be electrically connected to each other at an edge of the optical panel 310 and receive the same signal. The number of first electrodes 120 included in a first sensing electrode 120TX may be appropriately controlled according to a touch sensing solution.

Each second sensing electrode 230TX may include one or more common electrodes 230a. Referring to FIG. 21, a second sensing electrode 230RX may include a plurality of neighboring common electrodes 230a included in a unit lens LU and in this case, the plurality of common electrodes 230a comprising one second sensing electrode 230RX may be electrically connected to each other at the edge of the optical panel 310 and receive the same signal. The number of common electrodes 230a included in a second sensing electrode 230RX may be appropriately controlled according to the touch sensing resolution.

Referring to FIG. 22, each second sensing electrode 230RX may include one of the plurality of common electrodes 230a that comprise the unit lens LU. That is, each common electrode 230a may be used as the second sensing electrode 230RX.

Similarly, each first electrode 120 may be used as the first sensing electrode 120TX and one of two or more first electrodes 120 may be selected to be used as the first sensing electrode 120TX.

As described above, since the common electrode 230a of the first electrode 120 and second electrodes 230 of an optical system according to an exemplary embodiment of the present disclosure serves to sense an external touch by forming a touch sensing capacitor in touch mode and forming an electric field in the liquid crystal layer 3 in multi-view mode, product competitiveness may be increased by reducing the thicknesses, the weight, the number of manufacturing processes, process times, process costs, etc., of an optical system and a display device as compared conventional devices in which the touch panel and the liquid crystal lens panel are separately provided and sequentially attached with both the touch sensing function and the multi-view image display function. Further, the number of layers through which the image displayed by the display panel needs to pass is reduced, and as a result, luminance of the image may be enhanced. In addition, touch performance may be improved by lowering the capacitance between the common electrode 230a of the first electrode 120 used as the sensing input electrode Tx and the second electrode 230 used as the sensing output electrode Rx.

While embodiments of this disclosure have been described in connection with what is presently considered to be practical exemplary embodiments, it is to be understood that embodiments of the disclosure are not limited to the disclosed exemplary embodiments, but, on the contrary, are intended to cover various modifications and equivalent arrangements included within the spirit and scope of the appended claims.

What is claimed is:

1. An optical system comprising:
a first panel that includes a plurality of first electrodes;
a second panel facing the first panel and that includes a plurality of second electrodes; and
an optical conversion layer positioned between the first panel and the second panel that includes an optical conversion material,
wherein an electric field generated in the optical conversion layer by the plurality of first electrodes and the plurality of second electrodes in a multi-view mode changes a phase difference in the optical conversion layer based on a location of the optical conversion material,
the plurality of second electrodes includes a plurality of sub electrodes and a common electrode, and
the plurality of first electrodes and the common electrode form a touch sensing capacitor to sense a touch in a touch mode,
wherein the plurality of sub electrodes control the optical conversion layer in the multi-view mode and do not sense output in the touch mode,
wherein the second panel includes a first insulating layer positioned between the plurality of sub electrodes and the common electrode, and the first insulating layer includes an organic insulating material.

2. The optical system of claim 1, wherein:
the plurality of sub electrodes includes a plurality of upper electrodes and a plurality of lower electrodes positioned on different layers.

3. The optical system of claim 1, wherein:
the common electrode includes a first common electrode positioned at a center of a unit lens and one first common electrode is provided per unit lens.

4. The optical system of claim 3, wherein:
the first common electrode and a bus line are positioned on a same layer.

5. The optical system of claim 4, wherein:
the common electrode includes second common electrodes positioned at both sides of the first common electrode with the first common electrode interposed therebetween.

6. The optical system of claim 5, wherein:
the second common electrode includes a transparent conductive material and is positioned on a different layer from the bus line, and
the first common electrode and the second common electrode are connected to the bus line.

7. The optical system of claim 3, wherein:
the first common electrode includes a transparent conductive material that includes at least one of indium tin oxide (ITO), indium zinc oxide (IZO), graphene, and a metal nanowire, and is connected to a bus line most adjacent to a lens area.

8. The optical system of claim 3, wherein:
the common electrode is positioned among the plurality of sub electrodes, and both sides of the common electrode are spaced apart from the plurality of sub electrodes by a predetermined distance in a direction normal to a thickness direction of the optical system.

* * * * *